(12) United States Patent
Ajisaka

(10) Patent No.: US 10,214,100 B2
(45) Date of Patent: Feb. 26, 2019

(54) VEHICLE FLOOR LOWER STRUCTURE

(71) Applicant: TOYOTA JIDOSHA KABUSHIKI KAISHA, Toyota-shi (JP)

(72) Inventor: Satoshi Ajisaka, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/280,590

(22) Filed: Sep. 29, 2016

(65) Prior Publication Data

US 2017/0106744 A1 Apr. 20, 2017

(30) Foreign Application Priority Data

Oct. 20, 2015 (JP) .................................. 2015-206558

(51) Int. Cl.
| | |
|---|---|
| *B60K 15/01* | (2006.01) |
| *B60K 15/063* | (2006.01) |
| *B60K 1/04* | (2019.01) |
| *B60K 15/04* | (2006.01) |
| *B60K 13/04* | (2006.01) |

(52) U.S. Cl.
CPC .............. *B60K 15/063* (2013.01); *B60K 1/04* (2013.01); *B60K 13/04* (2013.01); *B60K 15/04* (2013.01); *B60K 2001/0416* (2013.01); *B60K 2001/0438* (2013.01); *B60K 2015/0474* (2013.01); *B60K 2015/0634* (2013.01); *B60Y 2200/92* (2013.01)

(58) Field of Classification Search
CPC B60K 2001/0438; B60K 13/00; B60K 15/00; B60K 2015/0631
USPC ............................... 180/68.5, 309, 69.4, 69.5
See application file for complete search history.

(56) References Cited

U.S. PATENT DOCUMENTS

| | | | | |
|---|---|---|---|---|
| 6,026,974 A * | 2/2000 | Burt | ....................... | B60K 15/00 |
| | | | | 220/23.4 |
| 7,237,644 B2 * | 7/2007 | Matsumoto | ............ | B60K 13/04 |
| | | | | 180/309 |
| 7,654,351 B2 * | 2/2010 | Koike | ...................... | B60K 1/04 |
| | | | | 180/68.1 |
| 7,743,863 B2 * | 6/2010 | Shindou | ................... | B60K 1/04 |
| | | | | 180/68.5 |
| 8,887,695 B2 * | 11/2014 | Aso | ..................... | F02M 25/0854 |
| | | | | 123/518 |
| 8,978,617 B2 * | 3/2015 | Matsuda | ................. | F02B 77/00 |
| | | | | 123/198 E |
| 9,139,074 B2 * | 9/2015 | Jarocki | .................... | B60K 1/04 |
| 9,499,205 B1 * | 11/2016 | Elia | ....................... | B62D 21/15 |

(Continued)

FOREIGN PATENT DOCUMENTS

| | | |
|---|---|---|
| DE | 10 2013 215 507 A1 | 2/2015 |
| EP | 1 745 977 A1 | 1/2007 |

(Continued)

OTHER PUBLICATIONS

Extended European Search Report dated Mar. 24, 2017, in Patent Application No. 16190525.2.

*Primary Examiner* — Jeffrey J Restifo
(74) *Attorney, Agent, or Firm* — Oblon, McClelland, Maier & Neustadt, L.L.P.

(57) ABSTRACT

A vehicle floor lower structure comprising a fuel tank that is disposed under a floor of a vehicle, and a battery pack that is disposed under the floor of the vehicle and at a vehicle body rear side of the fuel tank, and the battery pack is configured to be a power source to drive a traction motor installed in the vehicle.

8 Claims, 8 Drawing Sheets

(56) References Cited

U.S. PATENT DOCUMENTS

| | | | |
|---|---|---|---|
| 2004/0069551 A1* | 4/2004 | Greil | B60K 15/067 180/69.4 |
| 2004/0099465 A1* | 5/2004 | Matsumoto | B60K 13/04 180/309 |
| 2006/0238000 A1* | 10/2006 | Tohda | B60K 13/04 296/204 |
| 2006/0289224 A1* | 12/2006 | Ono | B60K 1/04 180/311 |
| 2007/0240926 A1* | 10/2007 | Chae | B60K 13/04 180/309 |
| 2008/0000703 A1* | 1/2008 | Shindou | B60K 1/04 180/68.5 |
| 2008/0196957 A1* | 8/2008 | Koike | B60K 1/04 180/68.5 |
| 2008/0283316 A1* | 11/2008 | Ono | B60K 15/063 180/68.5 |
| 2009/0014229 A1* | 1/2009 | Fujita | B60K 13/04 180/309 |
| 2010/0065359 A1* | 3/2010 | Jufuku | B60K 1/04 180/68.5 |
| 2010/0101881 A1* | 4/2010 | Yoda | B60K 1/04 180/68.5 |
| 2010/0116576 A1* | 5/2010 | Jufuku | B60K 1/04 180/68.5 |
| 2011/0297127 A1 | 12/2011 | Aso | |
| 2013/0045398 A1* | 2/2013 | Katano | B60K 1/04 429/7 |
| 2013/0133961 A1* | 5/2013 | Matsuda | B60K 6/40 180/65.22 |
| 2013/0235526 A1 | 9/2013 | Watanabe | |
| 2013/0241282 A1* | 9/2013 | Ikeno | B60R 16/0215 307/10.1 |
| 2013/0248264 A1* | 9/2013 | Matsuda | B60K 1/04 180/65.22 |
| 2013/0248267 A1* | 9/2013 | Nitawaki | B60K 1/04 180/68.5 |
| 2013/0248268 A1* | 9/2013 | Matsuda | B60K 1/04 180/68.5 |
| 2013/0319779 A1* | 12/2013 | Nitawaki | B60L 11/1874 180/68.5 |
| 2013/0327583 A1* | 12/2013 | Nitawaki | B60K 1/04 180/68.5 |
| 2014/0231158 A1* | 8/2014 | Tohara | B60K 1/04 180/65.21 |
| 2014/0262573 A1* | 9/2014 | Ito | B60K 1/04 180/68.5 |
| 2015/0197144 A1* | 7/2015 | Jarocki | B60K 1/04 180/232 |
| 2017/0025902 A1* | 1/2017 | Yuasa | H04B 5/0093 |

FOREIGN PATENT DOCUMENTS

| | | |
|---|---|---|
| EP | 2 241 467 A1 | 10/2010 |
| EP | 2 783 890 A1 | 10/2014 |
| JP | 2009-029159 A | 2/2009 |
| JP | 2014-019260 A | 2/2014 |
| JP | 2015-123838 A | 7/2015 |
| WO | 2010/092690 A1 | 8/2010 |
| WO | 2013/065798 A1 | 5/2013 |

* cited by examiner

VEHICLE FLOOR LOWER STRUCTURE

CROSS-REFERENCE TO RELATED APPLICATION

This application claims priority under 35 USC 119 from Japanese Patent Application, No. 2015-206558 filed Oct. 20, 2015, the disclosure of which is incorporated by reference herein in its entirely.

BACKGROUND

Technical Field

Preferred embodiments relate to a vehicle floor lower structure.

Related Art

Conventional structures are known in which a battery pack is disposed below a floor of a vehicle, and a fuel tank is also disposed below the floor of the vehicle, at a vehicle body rear side of the battery pack (see, for example, Japanese Patent Application Laid-Open (JP-A) No. 2014-19260).

However, when the fuel tank is disposed at the vehicle body rear side of the battery pack and a collision load is input to the fuel tank during a rear-end collision of the vehicle, there is a possibility of issues such as damage to the fuel tank occurring. There is accordingly still room for improvement of such structures in order to reduce the input of the collision load to the fuel tank during a rear-end collision of the vehicle.

BRIEF SUMMARY

The preferred embodiments describe a vehicle floor lower structure capable of reducing an input of a collision load to a fuel tank during a rear-end collision of a vehicle.

A vehicle floor lower structure of a first aspect of the disclosure includes a fuel tank that is disposed under a floor of a vehicle, and a battery pack that is disposed under the floor of the vehicle at a vehicle body rear side of the fuel tank. The battery pack being a power source to drive a traction motor installed in the vehicle.

In the first aspect, the battery pack is disposed at the vehicle body rear side of the fuel tank. Thus, the collision load is suppressed by the battery pack from being transmitted to the fuel tank during a rear-end collision of the vehicle. Namely, the input of the collision load to the fuel tank during a rear-end collision of the vehicle is reduced.

A vehicle floor lower structure of a second aspect of the disclosure includes the vehicle floor lower structure of the first aspect, and further includes a fuel supply port for supplying fuel to the fuel tank disposed at a vehicle body upper rear side of the battery pack, and an inlet pipe that links the fuel tank and the fuel supply port is routed at a vehicle body upper side of the battery pack.

In the second aspect, the inlet pipe is routed at the vehicle body upper side of the battery pack. Thus, impact due to flying stones and the like while the vehicle is travelling is suppressed from being applied to the inlet pipe. Namely, the inlet pipe is protected by the battery pack.

A vehicle floor lower structure of a third aspect of the present disclosure includes the vehicle floor lower structure of the second aspect, wherein an upper recessed section, in which a portion of the inlet pipe is disposed, is formed at an upper face of the battery pack.

In the third aspect, the upper recessed section, in which a portion of the inlet pipe is disposed, is formed at the upper face of the battery pack. The inlet pipe is thereby protected by the battery pack during a vehicle collision.

A vehicle floor lower structure of a fourth aspect of the present disclosure includes the vehicle floor lower structures of the second aspect or the third aspect, further includes an exhaust pipe that extends from an engine toward the vehicle body rear side that is routed at a vehicle body lower side of the battery pack.

In the fourth aspect, the exhaust pipe that extends from the engine toward the vehicle body rear side is routed at the vehicle body lower side of the battery pack. Thus, the inlet pipe is disposed at a distance from the exhaust pipe, and heat damage to the inlet pipe by the exhaust pipe is reduced.

A vehicle floor lower structure of a fifth aspect of the present disclosure includes the vehicle floor lower structure of the fourth aspect, wherein a lower recessed section, in which a portion of the exhaust pipe is disposed, is formed at a lower face of the battery pack.

In the fourth aspect, the lower recessed section, in which a portion of the exhaust pipe is disposed, is formed at the lower face of the battery pack. Space to install the exhaust pipe is thereby obtained, even in vehicles with a low vehicle height.

A vehicle floor lower structure of the sixth aspect of the present disclosure includes the vehicle floor lower structure of the third aspect, and further includes an exhaust pipe, wherein a lower recessed section, in which a portion of the exhaust pipe that extends from an engine toward the vehicle body rear side is disposed, is formed at a lower face of the battery pack, and the upper recessed section and the lower recessed section are formed at a distance from each other in plan view.

In the sixth aspect, the upper recessed section and the lower recessed section are formed at a distance from each other in plan view. Thus, the thickness of the battery pack is suppressed from becoming locally thin, and the thickness of the battery pack is substantially uniform, compared to configurations in which the upper recessed section and the lower recessed section are formed in the same position as each other in plan view.

A vehicle floor lower structure of a seventh aspect of the present disclosure is the vehicle floor lower structure of any one of the fourth aspect to the sixth aspect, further including a thermal insulation member that is disposed between the battery pack and the exhaust pipe.

In the seventh aspect, the thermal insulation member is disposed between the battery pack and the exhaust pipe. Heat damage to the battery pack by the exhaust pipe is thereby reduced.

DETAILED DESCRIPTION

Figure 1:
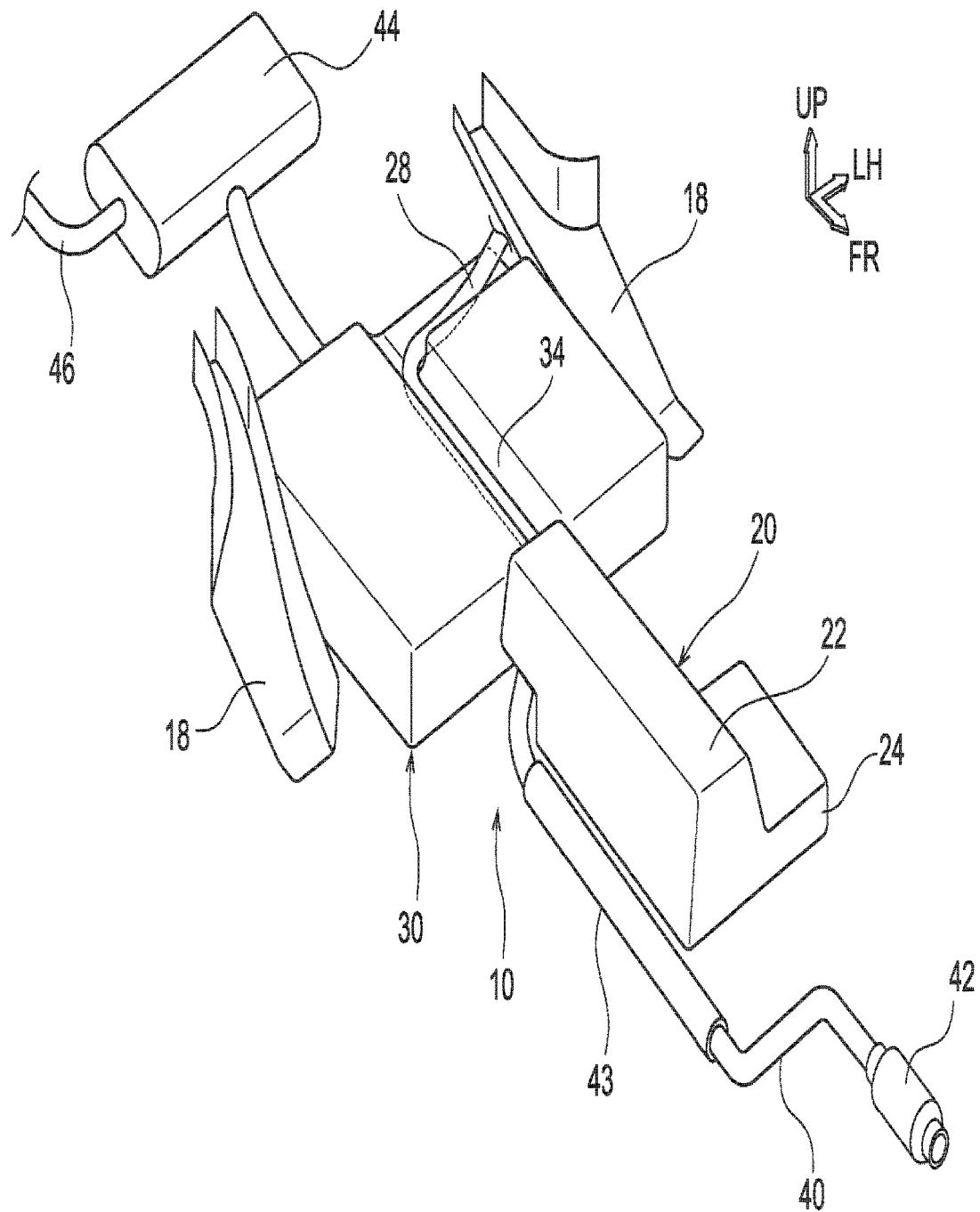
FIG. 1 is a perspective view illustrating a vehicle floor lower structure according to a first exemplary embodiment as viewed diagonally from above.
Figure 2:
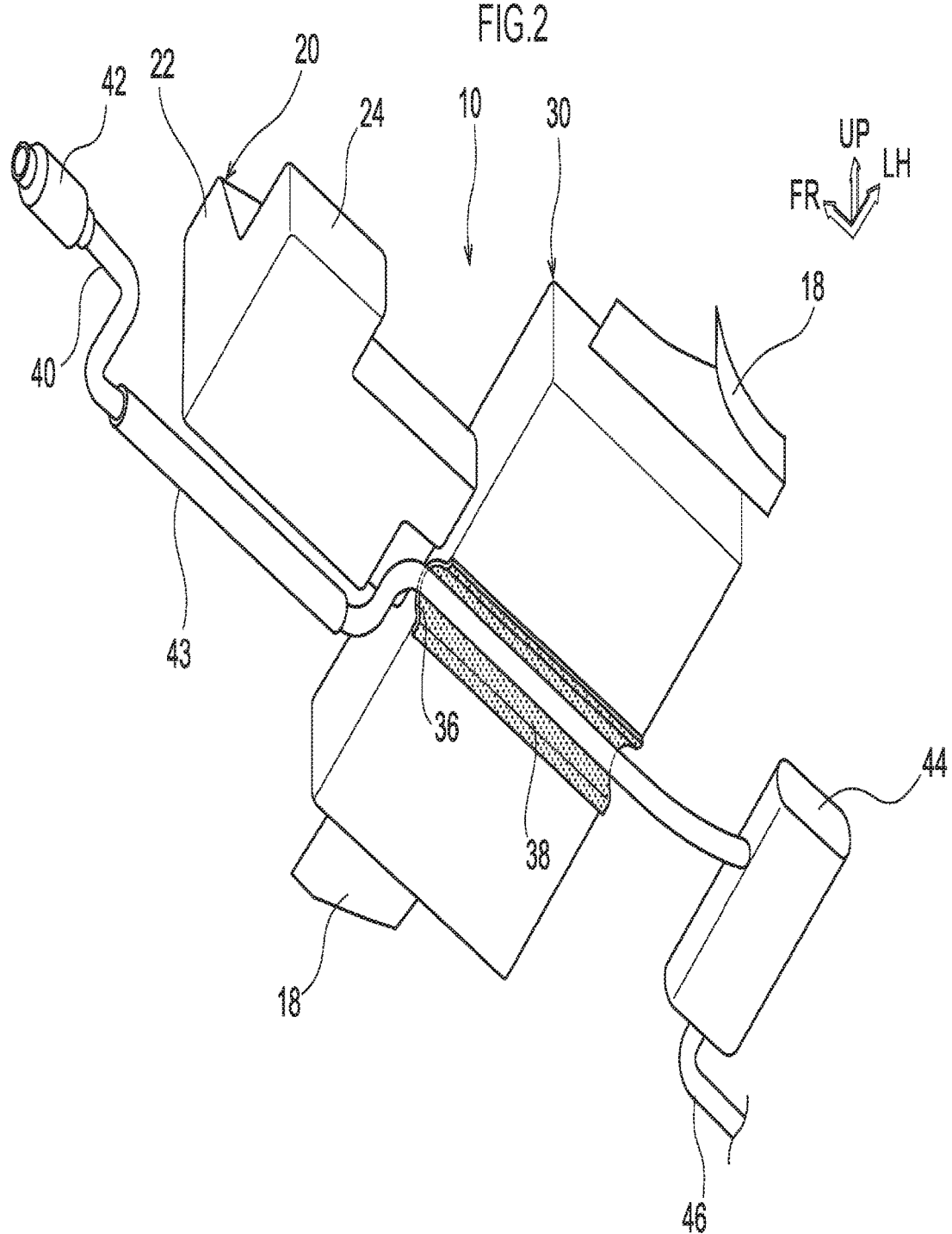
FIG. 2 is a perspective view illustrating a vehicle floor lower structure according to the first exemplary embodiment as viewed diagonally from below.
Figure 3:
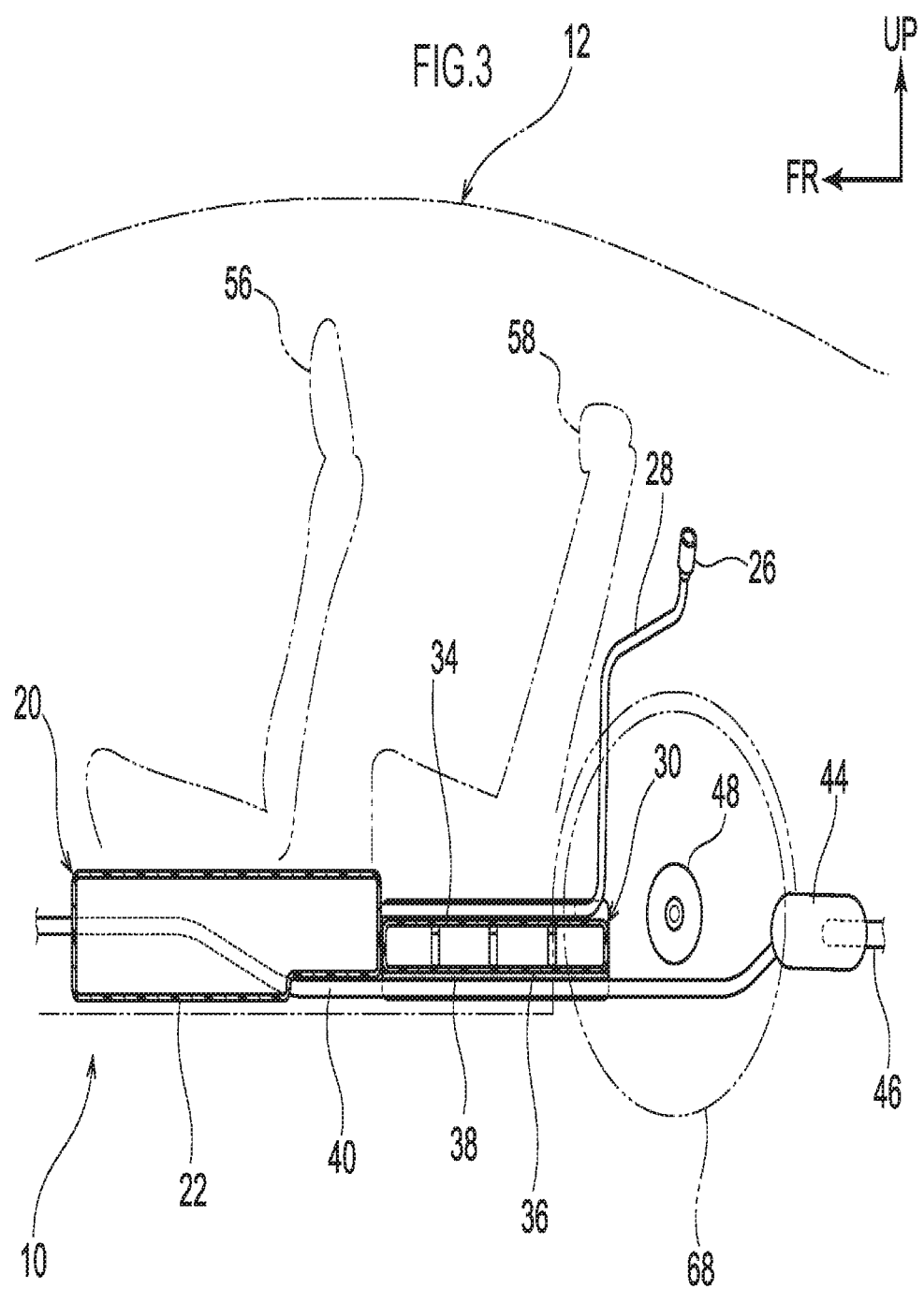
FIG. 3 is side view illustrating a partial cross-section of a vehicle including a vehicle floor lower structure according to the first exemplary embodiment.

Detailed explanation follows regarding exemplary embodiments according to the present disclosure, based on the examples illustrated in the drawings. Note that for ease of explanation, in each of the drawings, the arrow UP indicates the vehicle body upper direction, the arrow FR indicates the vehicle body front direction, and the arrow LH indicates the vehicle body left direction. In the below explanation, unless specifically stated otherwise, reference to the up-down, front-rear, and left-right directions refers to up-down in the vehicle body up-down direction, front-rear in the vehicle body front-rear direction, and left-right in the vehicle body left-right direction.

First Exemplary Embodiment

As illustrated in FIGS. 1 to 5, a vehicle floor lower structure 10 according to a first exemplary embodiment includes a fuel tank 20 and a battery pack 30 disposed at a vehicle body lower side of a floor panel 14 configuring a floor of a vehicle 12, and disposed between an axle of front wheels 66 and an axle of rear wheels 68 that are separated in the front-rear direction. An engine 16 is installed in a front section between the left and right front wheels 66 of the vehicle 12, and gasoline serving as fuel supplied to the engine 16 is stored in the fuel tank 20.

A traction motor (not illustrated in the drawings) used to drive the front wheels is also installed in the front section of the vehicle 12, and the battery pack 30 is a power source that drives the traction motor. Namely, the vehicle 12 is what is referred to as a hybrid vehicle that is capable of running on not only gasoline, but also electricity. The battery pack 30 is disposed in close proximity to a rear side of the fuel tank 20. In other words, the fuel tank 20 is disposed in close proximity to a front side of the battery pack 30.

Specifically, the fuel tank 20 is formed in a substantially "L" shape in plan view using a resin material. The fuel tank 20 includes a main tank section 22 extending along a front-rear direction at a substantially vehicle width direction center portion, and a sub tank section 24 extending from a front portion of the main tank section 22 toward a left side (vehicle width direction outer side of the main tank section 22). The main tank section 22 is formed in a substantially isosceles trapezoidal shape in face-on view, and is disposed inside a tunnel section 15 that has a substantially isosceles trapezoidal shaped cross-section and is formed so as to extend along the vehicle body front-rear direction at a substantially vehicle width direction center portion of the floor tunnel 14.

The sub tank section 24 is formed in a substantially rectangular shape that has a smaller height than the main tank section 22 in face-on cross-section view, and is disposed at the lower side of the floor tunnel 14 (at front seat 56) at a left side (vehicle width direction outer side) of the tunnel section 15. The main tank section 22 and the sub tank section 24 are integrally formed, and are in communication with each other. The capacity of the fuel tank 20 is defined by the above configuration.

Figure 6:
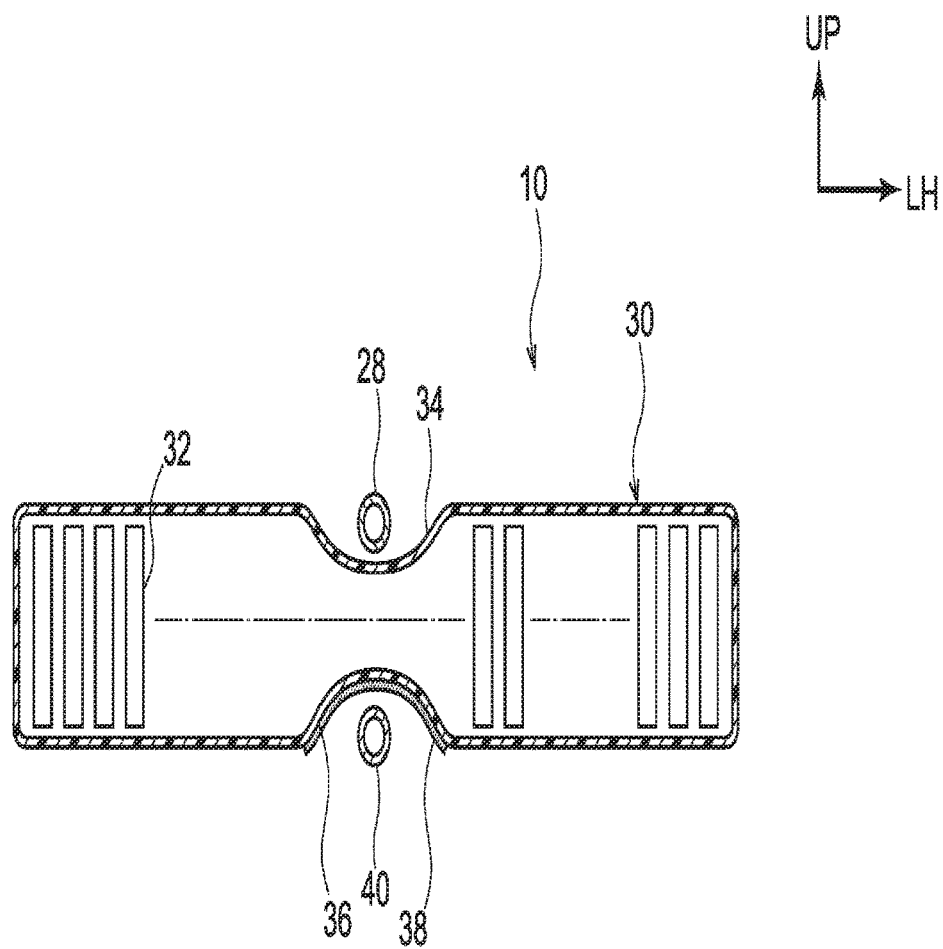
FIG. 6 is a cross-section along arrow line Y-Y in FIG. 4.

The battery pack 30 is formed in a substantially rectangular shape that is longer in the vehicle width direction than in the front-rear direction in plan view, and includes multiple battery cells 32 inside (see FIG. 6). The battery pack 30 is disposed at a substantially vehicle width direction center portion at a vehicle body lower side of rear seats 58, and a left and right pair of rear floor members 18 are respectively disposed at vehicle width direction outer sides of the battery pack 30.

A fuel supply port 26 for supplying fuel (e.g. gasoline) to the fuel tank 20 is disposed at an upper rear side of the battery pack 30. The fuel tank 20 and the fuel supply port 26 are connected to each other by an inlet pipe 28. Specifically, a front end portion (one end portion) of the inlet pipe 28 is placed in communication with a rear end portion of the main tank section 22 of the fuel tank 20, and a rear end portion (another end portion) of the inlet pipe 28 is in communication with the fuel supply port 26.

The inlet pipe 28 is routed at an upper side of the battery pack 30. Specifically, an upper recessed portion 34 (see FIG. 6) is formed in a substantially semicircular arc shaped cross-section and extends along the front-rear direction at a substantially vehicle width direction center portion of an upper face of the battery pack 30. A portion of the inlet pipe 28 is routed so as to pass through the upper recessed portion 34 and extends along the front-rear direction.

An exhaust pipe 40 is routed from a substantially vehicle width direction center portion of the engine 16 toward the rear side. A catalyst 42 is placed in communication with the exhaust pipe 40 between the engine 16 and the fuel tank 20. Harmful substances in the exhaust gas discharged from the engine 16 into the exhaust pipe 40 are cleaned by being oxidized or reduced by the catalyst 42.

The exhaust pipe 40 that extends further toward the rear side from the catalyst 42 bends toward a right side (vehicle width direction outer side), and then bends back toward the rear side. Namely, a portion of the exhaust pipe 40 passes beside the main tank section 22 at a right side (the vehicle width direction outer side) of the fuel tank 20, this being the opposite side to the sub tank section 24, and extends toward the rear side.

Note that the portion of the exhaust pipe 40 that passes by at the right side of the fuel tank 20 has a two layer pipe structure, and configures a sub muffler 43. A thermal insulation member 39 with a substantially semicircular arc shaped cross-section is disposed extending along the front-rear direction between this portion of the exhaust pipe 40 and the floor panel 14.

After passing by at the right sides of the fuel tank 20 and extending toward the rear side, the exhaust pipe 40 bends toward a vehicle width direction inner side (left side) at a rear portion of the main tank section 22, and then bends back toward the rear side. A recessed portion 22A with a substantially rectangular shape in bottom face view to permit passage of the exhaust pipe 40 is thereby formed at a lower face at the rear portion of the main tank section 22.

The exhaust pipe 40 is routed so as to pass by at a vehicle body lower side of the battery pack 30 and extends toward the rear side. Accordingly, the exhaust pipe 40 mainly passes through at a substantially vehicle width direction center portion of the vehicle 12 excluding a portion of the exhaust pipe 40 that passes by at the right sides of the fuel tank 20.

Specifically, a lower recessed section 36 (see FIG. 6) with a substantially semicircular arc shaped cross-section extending along the front-rear direction is formed at a substantially vehicle width direction center portion of a lower face of the battery pack 30. A portion of the exhaust pipe 40 is disposed so as to pass through the lower recessed section 36 extending toward the rear side. Note that a thermal insulation member 38 (see FIG. 6) with a substantially semicircular arc shaped cross-section extending along the front-rear direction is provided in advance inside the lower recessed section 36, and the exhaust pipe 40 is routed so as to pass by at a vehicle body lower side of the thermal insulation member 38.

After passing through the lower recessed section 36 of the battery pack 30 and extending toward the rear side, the exhaust pipe 40 is placed in communication with a main muffler 44. The main muffler 44 is formed in a substantially elliptical column shape with its axial direction along the vehicle width direction. The exhaust pipe 40 is connected to a substantially vehicle width direction center portion at a front end portion of the main muffler 44. A muffler cutter 46 extends from a side portion of the main muffler 44 toward the rear side.

Figure 4:
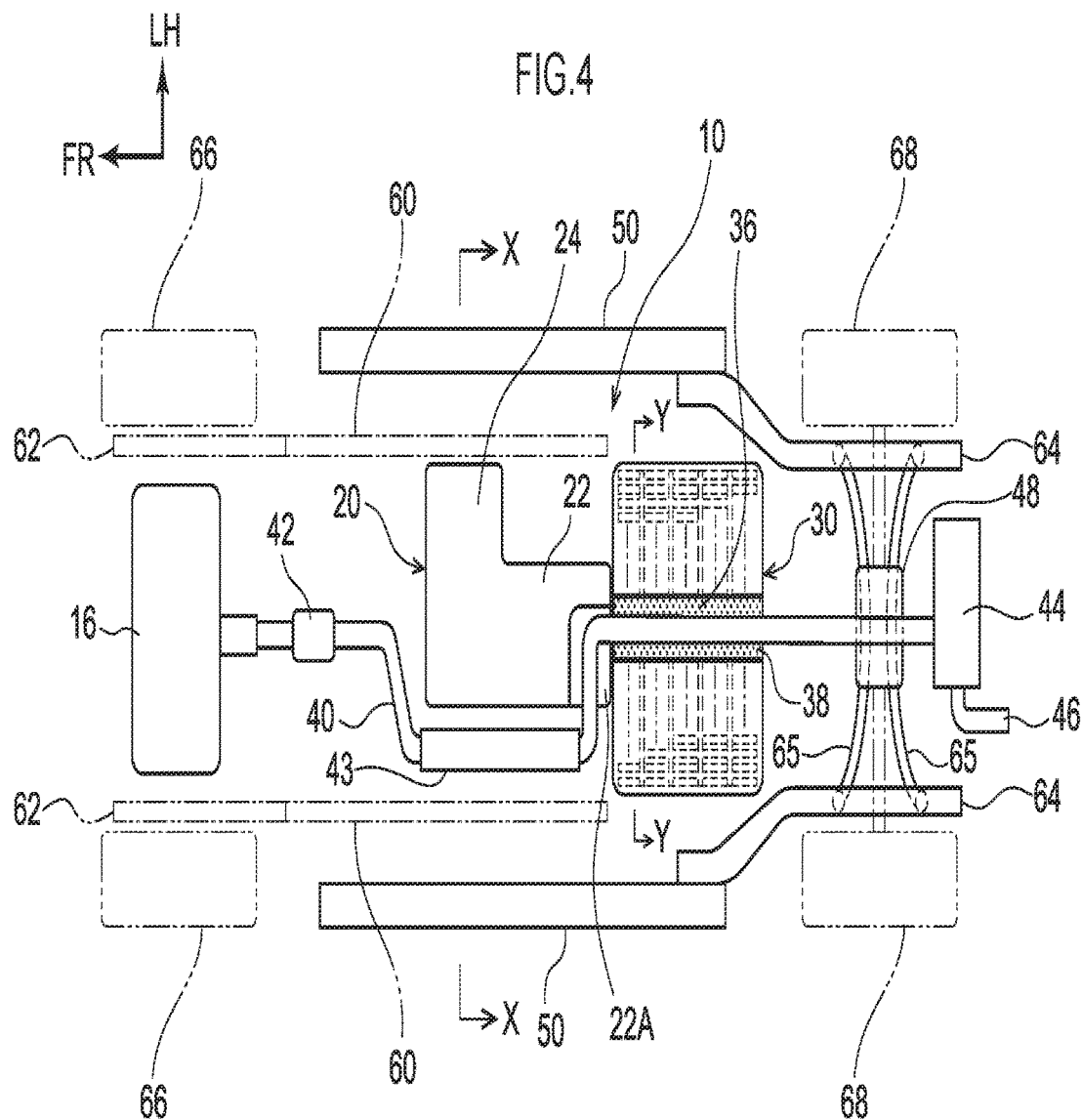
FIG. 4 is a bottom view illustrating a vehicle including a vehicle floor lower structure according to the first exemplary embodiment.
Figure 5:
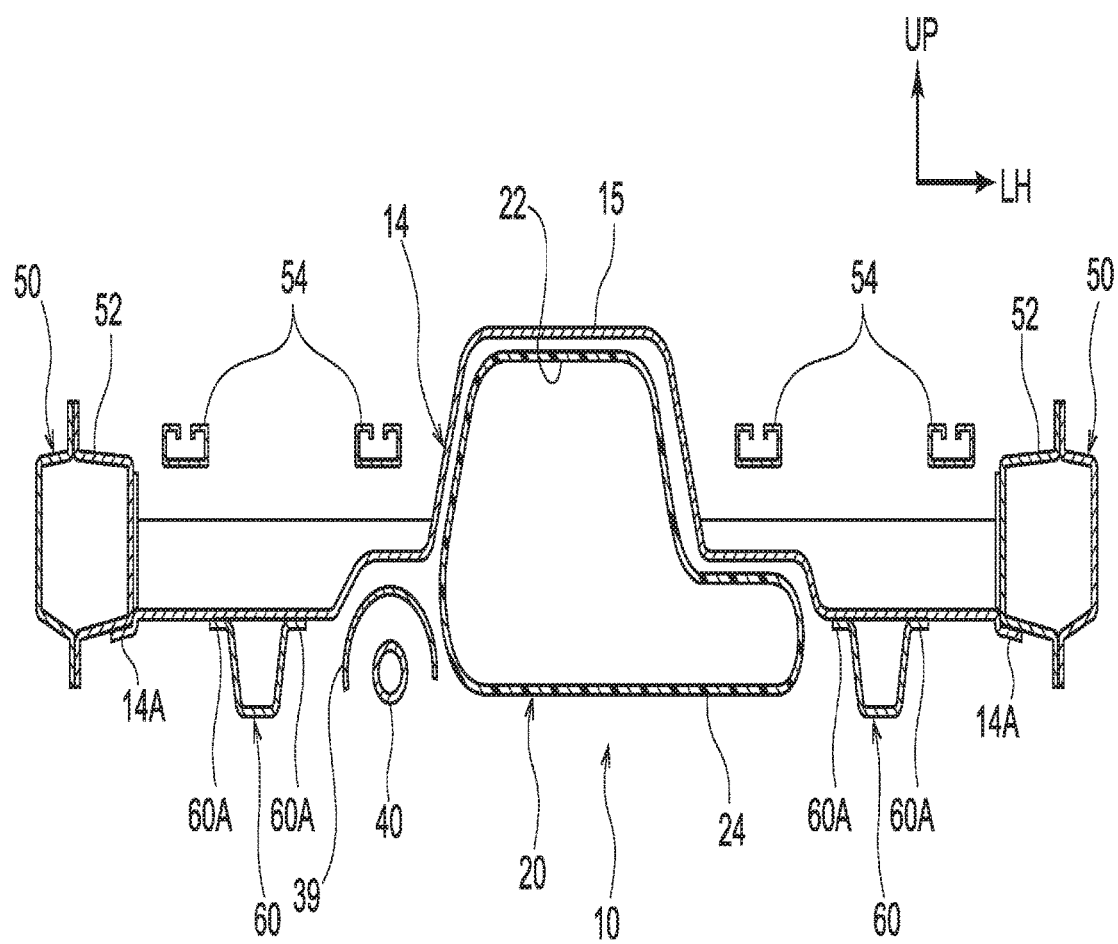
FIG. 5 is a cross-section along arrow line X-X in FIG. 4.

As illustrated in FIG. 5, vehicle width direction outer side end portions 14A of the floor panel 14 are respectively joined to lower faces of rocker inner panels 52 of a left and right pair of rockers 50 that respectively extend along the front-rear direction at either side of the vehicle 12. As illustrated in FIGS. 4 and 5, a left and right pair of under reinforcements 60 that extends along the front-rear direction is respectively joined to lower faces of the floor panel 14 that are further toward vehicle width direction inner sides from the rockers 50, and further toward vehicle width direction outer sides from the fuel tank 20.

Each under reinforcement 60, serving as a vehicle body frame member, is formed with a substantially hat shaped cross-section profile. Flange portions 60A at both the left and right side of each under reinforcement 60 are joined to the lower face of the floor panel 14 by welding or the like to form a chamber profile. Note that the portion of the exhaust pipe 40 that passes at the right side of the fuel tank 20 passes between the main tank section 22 and the under reinforcement 60 disposed at the right side.

Each under reinforcement 60 is disposed at the front side of the battery pack 30 in side-on view. Front end portions of the respective under reinforcements 60 are integrally joined to rear end portions of a left and right pair of front side members 62 each extending toward the front side.

Left and right pairs of seat rails 54 for providing the respective front seats 56 (the driving seat and front passenger seat) are respectively disposed at either left and right side of the tunnel section 15, at an upper face of the floor panel 14. Each seat rail 54 extends along the front-rear direction and is configured such that a front-rear direction position of the respective front seat 56 is adjustable.

A traction motor 48 used to drive the rear wheels is provided at a rear side of the battery pack 30 between the left and right rear wheels 68. Namely, the vehicle 12 is capable of switching between front-wheel drive and four-wheel drive.

Outer walls of front end portions of a left and right pair of rear side members 64 are respectively joined to the rocker inner panels 52 at rear end portions of the respective rockers 50. Each rear side member 64 extends toward the rear side. Rear sub frames 65 that couple between the left and right rear side members 64 are respectively disposed at front and rear sides of the traction motor 48.

Explanation follows regarding operation of the vehicle floor lower structure 10 according to the first exemplary embodiment configured as described above.

As described above, the fuel tank 20 is disposed at the front side of the battery pack 30. Thus, when the vehicle 12 has been in a rear-end collision, a collision load is directly input to the battery pack 30 through the respective rear sub frames 65, and direct input of the collision load to the fuel tank 20 is reduced or prevented. This enables the input of the collision load toward the fuel tank 20 during a rear-end collision of the vehicle 12 to be decreased, enabling issues such as damage to the fuel tank 20 to be reduced or prevented from occurring.

The fuel tank 20 and the battery pack 30, these being heavy components, are disposed between the axis of the front wheels 66 and the axis of the rear wheels 68, and are arranged along the front-rear direction at the vehicle body lower side of the floor panel 14. This enables distribution of load at the front section side and the rear section side of the vehicle 12 to be optimized, and also enables the center of gravity of the vehicle 12 to be lowered. The maneuverability of the vehicle 12 is accordingly improved.

Note that, when the fuel tank 20 and the battery pack 30 are disposed at the vehicle body lower side of the floor panel 14, there is also an advantage in that the design of the body further toward the upper side of the floor panel 14 is not restricted as a result. In particular, when the battery pack 30 is disposed at the vehicle body lower side of the floor panel 14, there is an advantage in that luggage space inside the vehicle 12 can be increased compared to configurations in which the battery pack 30 is disposed at a rear side of the rear seats 58.

Since the main tank section 22 is disposed inside of the tunnel section 15 whereby the main tank section 22 can be made tall, a vehicle width direction length of the main tank section 22 of the fuel tank 20 can be reduced. The under reinforcements 60, serving as vehicle body frame members extending along the front-rear direction, can be disposed at the vehicle width direction outer sides of the fuel tank 20. This enables the fuel tank 20 to be protected, not only in a rear-end collision of the vehicle 12, but also in a front-end collision or a side-on collision of the vehicle 12.

The vehicle 12 including the vehicle floor lower structure 10 according to the present exemplary embodiment enables the traction motor 48 used to drive the rear wheels to be disposed at the rear side of the battery pack 30. This enables product appeal to be increased compared to hybrid vehicles which are only disposed with a traction motor used for front-wheel drive and which are not capable of switching between front-wheel drive and four-wheel drive.

The inlet pipe 28 is routed at the upper side of the battery pack 30, thereby enabling the inlet pipe 28 to be protected by the battery pack 30. Namely, this enables the impact from a flying stone or the like while the vehicle 12 is travelling to be suppressed or prevented from being imparted to the inlet pipe 28. The upper recessed portion 34 in which a portion of the inlet pipe 28 is disposed is formed at the upper face of the battery pack 30, thereby also enabling the inlet pipe 28 to be protected by the battery pack 30 during a collision of the vehicle 12.

The exhaust pipe 40 is routed at the vehicle body lower side of the battery pack 30 and the inlet pipe 28 is disposed at the opposite side of the battery pack 30 to the exhaust pipe 40, thereby enabling the inlet pipe 28 to be disposed at a distance from the exhaust pipe 40. This enables heat damage to the inlet pipe 28 by the exhaust pipe 40 to be reduced.

The lower recessed section 36 in which a portion of the exhaust pipe 40 is disposed is formed in the lower face of the battery pack 30, thereby enabling space to install the exhaust pipe 40 to be obtained, even if the vehicle 12 has a low height. The thermal insulation member 38 is disposed between the battery pack 30 and the exhaust pipe 40, thereby also enabling heat damage to the battery pack 30 by the exhaust pipe 40 to be reduced.

Second Exemplary Embodiment

Explanation follows a vehicle floor lower structure 110 according to a second exemplary embodiment. Note that locations that are similar to the first exemplary embodiment are appended with the same reference numerals, and detailed explanation thereof including common operation is omitted as appropriate.

Figure 7:
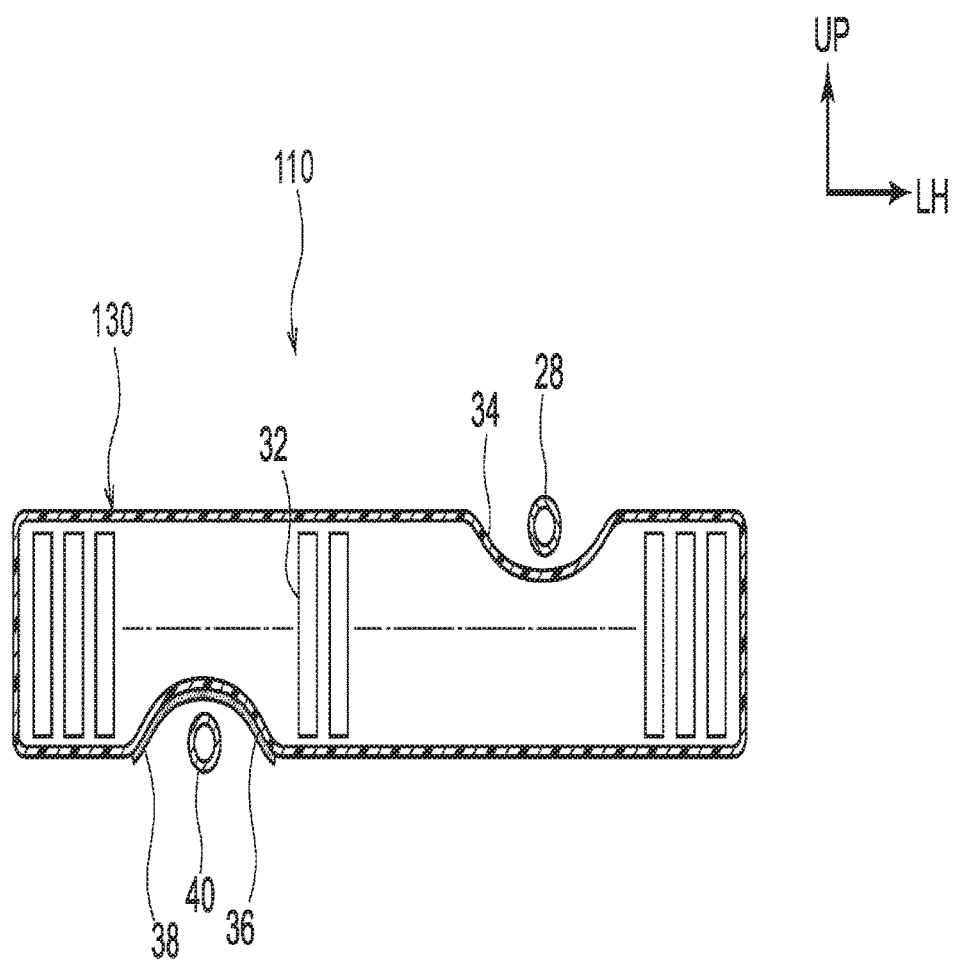
FIG. 7 is a cross-section corresponding to FIG. 6, illustrating a battery pack configuring a vehicle floor lower structure according to a second exemplary embodiment.

As illustrated in FIG. 7, the vehicle floor lower structure 110 according to the second exemplary embodiment is different from that in the first exemplary embodiment in the respect that the upper recessed portion 34 and lower recessed section 36 of the battery pack 130 are formed separated from each other in the vehicle width direction in plan view and face-on view. Namely, as illustrated in FIG. 7, in the vehicle floor lower structure 10 according to the first exemplary embodiment, the upper recessed portion 34 and the lower recessed section 36 are both formed in the substantially vehicle width direction center portion (in the same position as each other in plan view and face-on view), such that the thickness of the substantially vehicle width direction center portion of the battery pack 30 is locally thinner.

However, in the vehicle floor lower structure 110 according to the second exemplary embodiment, the upper recessed portion 34 and the lower recessed section 36 are not formed in the same upper and lower positions, thereby enabling a portion with a locally thin thickness to be prevented from occurring in the battery pack 130, enabling a substantially uniform thickness. The rigidity of the battery pack 130 can accordingly be made higher than in the first exemplary embodiment. This enables the number of battery cells 32 to be increased compared to the first exemplary embodiment, thereby enabling a driving range with the traction motor to be extended.

Third Exemplary Embodiment

Explanation follows regarding a vehicle floor lower structure 210 according to a third exemplary embodiment. Note that locations that are similar to the first exemplary embodiment and the second exemplary embodiment are appended with the same reference numerals, and detailed explanation thereof (including common operation) is omitted as appropriate.

Figure 8:
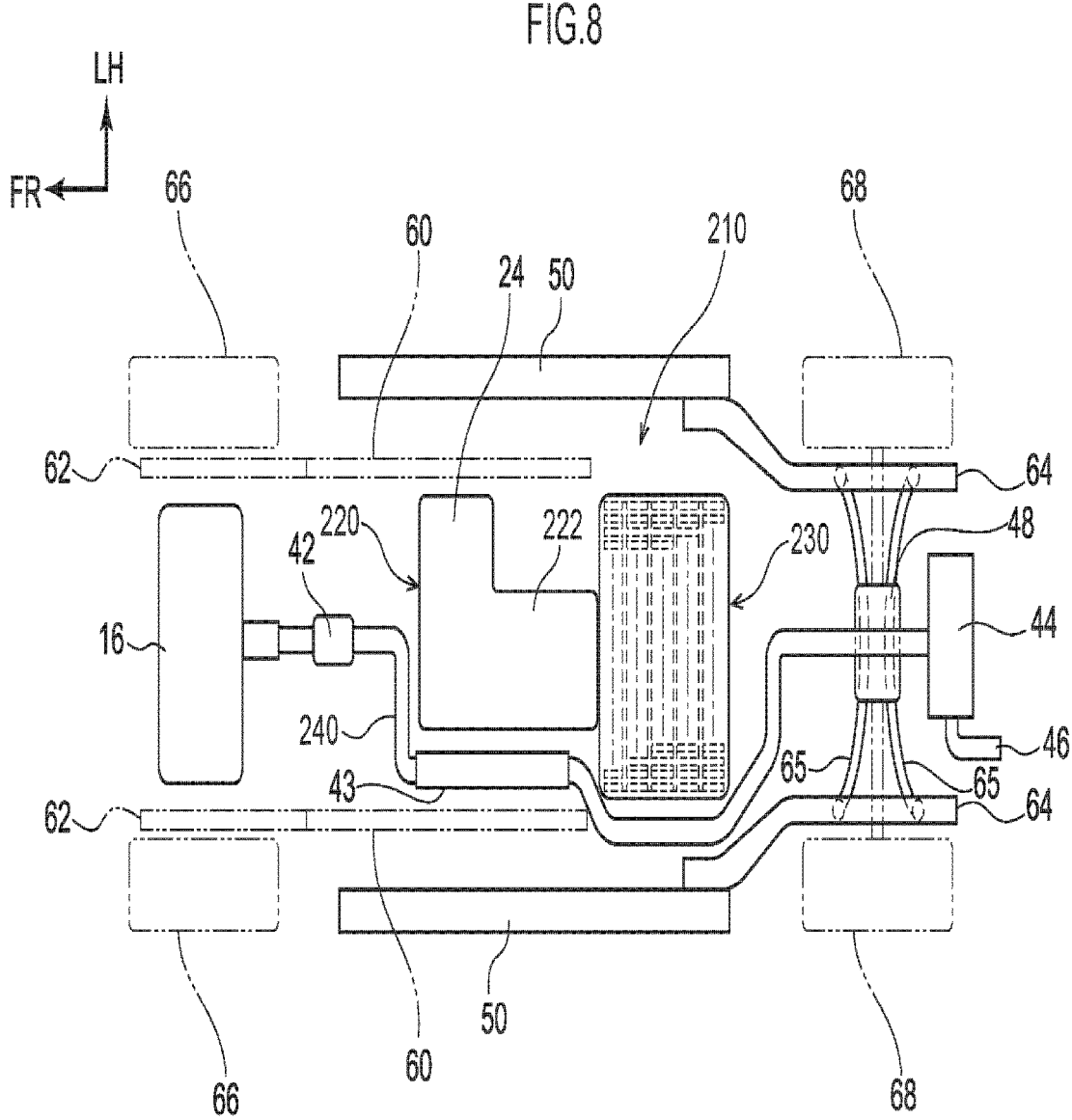
FIG. 8 is a bottom view illustrating a vehicle including a vehicle floor lower structure according to a second exemplary embodiment.

As illustrated in FIG. 8, the vehicle floor lower structure 210 according to the third exemplary embodiment is configured such that there is no portion of the exhaust pipe 240 routed at the vehicle body lower side of the battery pack 230. Namely, the exhaust pipe 240 of the third exemplary embodiment passes at the right side of the fuel tank 220, and also passes at a right side of the battery pack 230, namely, at the vehicle width direction inner side of the rocker 50 at the right side, and extends toward the rear side.

After having passed at the right side of the battery pack 230 extending toward the rear side, the exhaust pipe 240 bends toward the vehicle width direction inner side (left side) at the rear side of the battery pack 230, then bends back and extends again toward the rear side, and is placed in communication with the main muffler 44, similar to the first exemplary embodiment.

Since the exhaust pipe 20 of the third exemplary embodiment is routed so as to pass between the battery pack 230 and the rocker 50 at the right side and extend toward the rear side in this manner, there is no need to form the recessed portion 22A permitting the exhaust pipe 240 at the lower face of the rear portion side of the fuel tank 220. This enables the capacity of the fuel tank 220 to be increased compared to in the first exemplary embodiment.

By routing the exhaust pipe 240 in this manner, the lower recessed section 36 does not need to be formed in the lower face of the battery pack 230. This enables the rigidity of the battery pack 230 to be higher than in the first exemplary embodiment. Since the number of battery cells 32 can be increased compared to the first exemplary embodiment, the driving range with the traction motor can also be extended.

The vehicle floor lower structures 10, 110, and 210 according to the present exemplary embodiments have been explained above based on the drawings; however, the vehicle floor lower structures 10, 110, and 210 according to the present exemplary embodiments are not limited to that illustrated in the drawings, and obviously design modifications may be implemented as appropriate within a range not departing from the scope of the present claims. For example, a configuration may be applied in which neither the upper recessed portion 34 nor the lower recessed section 36 are formed in the upper face or lower face of the battery pack 30.

As long as the configuration is such that heat damage to the battery pack 30 from the exhaust pipe 40 is reduced, a configuration may be applied in which the thermal insulation member 38 is not provided inside the lower recessed section 36. The exhaust pipe 40 is not limited to a configuration that is routed bending as described above, and the exhaust pipe 40 may be configured routed curving in a circular arc shape in plan view, for example. In the drawings, the height of the battery pack 30 is higher than the height of the sub tank section 24, but is lower than the height of the main tank section 22; however, there is no limitation thereto.

What is claimed is:

1. A vehicle floor lower structure comprising:
   a fuel tank under a floor of a vehicle;
   a battery pack under the floor of the vehicle and at a vehicle body rear side of the fuel tank, and that is configured to be a power source to drive a traction motor installed in the vehicle, a front surface of the battery pack directly facing a rear surface of the fuel tank;
   a fuel supply port for supplying fuel to the fuel tank at a vehicle body upper rear side of the battery pack; and
   an inlet pipe that links the fuel tank and the fuel supply port at a vehicle body upper side of the battery pack, and that is overlapped with respect to the battery pack when viewed from above the vehicle in a vehicle up-down direction.

2. The vehicle floor lower structure of claim 1, wherein an upper recessed section is at an upper face of the battery pack, the upper recessed section including a portion of the inlet pipe.

3. The vehicle floor lower structure of claim 2, further comprising:
   an exhaust pipe, wherein
   a lower recessed section is at a lower face of the battery pack, and a portion of the exhaust pipe, that extends from an engine toward a vehicle body rear side, is in the lower recessed section, and
   the upper recessed section and the lower recessed section are separated by a distance from each other in the vehicle plan view.

4. The vehicle floor lower structure of claim 3, further comprising:
   a thermal insulation member between the battery pack and the exhaust pipe.

5. The vehicle floor lower structure of claim 3, wherein fuel tank includes a recessed portion on a bottom face of the fuel tank and an outlet of the recessed portion of the fuel tank is aligned with an inlet of the lower recessed section of the battery pack.

6. The vehicle floor lower structure of claim 1, further comprising:
   an exhaust pipe that extends from an engine toward a vehicle body rear side is routed at a vehicle body lower side of the battery pack.

7. The vehicle floor lower structure of claim 6, wherein a lower recessed section is at a lower face of the battery pack, the lower recessed section including a portion of the exhaust pipe.

8. The vehicle floor lower structure of claim 6, further comprising:
   a thermal insulation member between the battery pack and the exhaust pipe.

* * * * *